(12) United States Patent  
Leonard

(10) Patent No.: US 8,769,550 B1  
(45) Date of Patent: Jul. 1, 2014

(54) REPLY QUEUE MANAGEMENT

(71) Applicant: Sprint Communications Company L.P., Overland Park, KS (US)

(72) Inventor: Mark D. Leonard, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 56 days.

(21) Appl. No.: 13/659,465

(22) Filed: Oct. 24, 2012

(51) Int. Cl.
*G06F 3/00* (2006.01)
*G06F 9/46* (2006.01)

(52) U.S. Cl.
USPC ............ 719/314; 719/313; 718/102; 718/104

(58) Field of Classification Search
CPC . G06F 9/546; G06F 11/3409; G06F 11/0715; G06F 11/3452; G06F 15/17318; G06F 9/5066; G06F 9/5083; G06F 11/1482; G06F 11/3072; G06F 11/3447; G06F 2201/81; G06F 2201/865; G06F 2201/87
See application file for complete search history.

(56) References Cited

U.S. PATENT DOCUMENTS

| | | | |
|---|---|---|---|
| 2010/0162265 A1* | 6/2010 | Heddes .......................... | 719/314 |
| 2011/0041132 A1* | 2/2011 | Andrade et al. .............. | 718/102 |
| 2011/0265098 A1* | 10/2011 | Dozsa et al. .................. | 719/314 |
| 2012/0260261 A1* | 10/2012 | Tillier ........................... | 719/313 |
| 2012/0291034 A1* | 11/2012 | Kamath et al. ................ | 718/102 |

OTHER PUBLICATIONS

"Dynamic Thread Count Adaption for Multiple Services in SMP Environment", Ogasawara, 2008, pp. 1-8.*

* cited by examiner

*Primary Examiner* — Tuan Dao

(57) ABSTRACT

A method, system, and medium are provided for optimizing assignment of threads to queues within a messaging-middleware environment. Embodiments of the present invention evaluate the number of threads assigned to each individual queue and then assign a new thread to an appropriate queue based on current thread assignments. Different rules may be used to assign threads depending on the number of threads assigned to each queue. For example, initially any queue with less than a low threshold amount of active threads may be assigned threads until the low threshold is met. A different assignment methodology may be used once the low threshold is met. For example, once the low threshold is met, active queues having more than the low threshold, but less than a high threshold, may be assigned threads in a round robin fashion.

6 Claims, 10 Drawing Sheets

REPLY QUEUE MANAGEMENT

SUMMARY

Embodiments of the invention are defined by the claims below, not this summary. A high-level overview of various aspects of embodiments of the invention is provided here for that reason, to provide an overview of the disclosure and to introduce a selection of concepts that are further described below in the Detailed Description section. This Summary is not intended to identify key features or essential features of the claimed subject matter, nor is it intended to be used as an aid in isolation to determine the scope of the claimed subject matter.

In a first illustrative embodiment, one or more computer-readable media having computer-executable instructions embodied thereon for performing a method of optimizing an allocation of input threads to queues within a messaging-middleware environment are provided. The method comprises determining that a plurality of queues are currently available to an application. The method also comprises assigning, according to a first methodology, new input threads to each of the plurality of queues until all of the plurality of queues are assigned above a low threshold of active threads. The method also comprises, when all of the plurality of queues are assigned above the low threshold of active threads, assigning, according to a second methodology that is different from the first methodology, new input threads to each of the plurality of queues until all of the plurality of queues are assigned a high threshold of active threads.

In another illustrative embodiment, one or more computer-readable media having computer-executable instructions embodied thereon for performing a method of optimizing an allocation of threads to messaging-middleware queues are provided. The method further comprises receiving a request to assign an input thread to a queue. The input thread helps communicate a message from an application to the queue. The method further comprises retrieving a list of active queues that are designated to receive messages from the application. The method comprises determining an active thread number for each active queue on the list. The method comprises executing an assignment rule to select a specific queue from all of the active queues. The assignment rule is based on the active thread number for each active queue. The method also comprises assigning the input thread to the specific queue.

In a third illustrative embodiment, a method of optimizing an allocation of input threads to queues within a messaging-middleware environment is provided. The method comprises determining that a plurality of queues are currently available to an application. The method also comprises preferentially assigning, according to a first methodology, new input threads to each of the plurality of queues that are assigned less than a low threshold of active threads. The method also comprises, when all of the plurality of queues are assigned above the low threshold of active threads, assigning, according to a second methodology that is different from the first methodology, new input threads to each of the plurality of queues that are assigned less than a high threshold of active threads.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Figure 1:
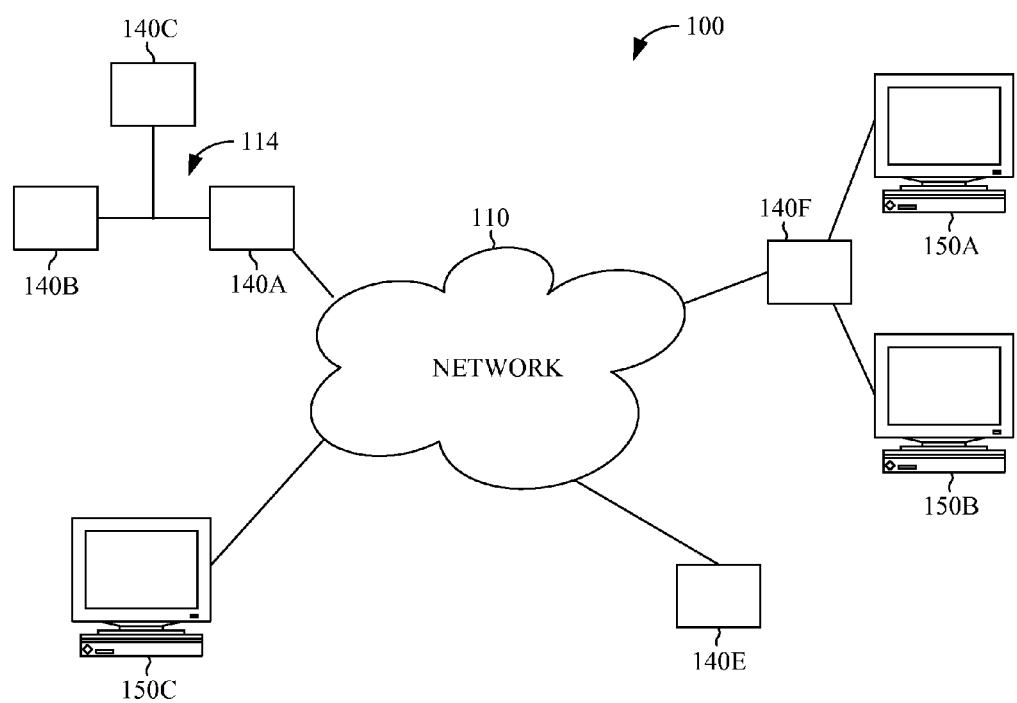
FIG. 1 is a drawing of an illustrative environment in which an embodiment of the present invention may operate.

Embodiments of the present invention will be better understood from the detailed description provided below and from the accompanying drawings of various embodiments of the invention. Embodiments of the present invention relate generally to a method of assigning threads to queues within a messaging-middleware environment. In one embodiment, input threads are assigned to input queues within a messaging-middleware environment. The input threads facilitate the communication of messages from an application to the input queues within the messaging-middleware environment. In some embodiments, there may be multiple active queues to which the thread may be assigned.

Embodiments of the present invention evaluate the number of threads assigned to each individual queue and then assign a new thread to an appropriate queue based on current thread assignments. In some situations, an instruction is generated to activate a new queue to which the new thread may be assigned. Initially, the number of threads assigned to each existing queue is determined. Different rules may be used to assign threads depending on the number of threads assigned to each queue. For example, initially any queue with less than a low threshold amount of active threads may be assigned threads until the low threshold is met. A different assignment methodology may be used once the low threshold is met. Once the low threshold is met, active queues having more than the low threshold of threads, but less than a high threshold, may be assigned threads in a round robin fashion.

Computing device 100 typically includes a variety of computer-readable media. Computer-readable media can be any available media that can be accessed by computing device 100 and includes both volatile and nonvolatile media, removable and nonremovable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Embodiments of the present invention can be practiced in a distributed computing environment, where multiple computing devices are communicatively interconnected through a network (e.g., local-area network (LAN) or a wide-area network (WAN) including the Internet). Referring initially to FIG. 1, a block diagram depicting an exemplary operating environment 100 is shown. The operating environment 100 comprises client computing devices 150A, 150B, and 150C, servers 140A, 140B, 140C, which communicate with each other via LAN 114, servers 140E and 140F all of which communicate with each other via network 110. Operating environment 100 is merely an example of one suitable networking environment and is not intended to suggest any limitation as to the scope of use or functionality of embodiments of the present invention. Neither should operating environment 100 be interpreted as having any dependency or requirement related to any single component or combination of components illustrated therein.

The client computing devices 150A, 150B, and 150C are configured for storing and/or processing computer-executable instructions and computer-readable data. By way of example only and not limitation, the client computing devices 150A, 150B, and 150C may be a personal computer, desktop computer, laptop computer, handheld device, cellular phone, consumer electronic, digital phone, smartphone, PDA, or the like. It should be noted that embodiments are not limited to implementation on such computing devices.

Network 110 might include a computer network or combination thereof. Examples of networks configurable to operate as network 110 include, without limitation, a wireless network, landline, cable line, digital subscriber line (DSL), fiber-optic line, local area network (LAN), wide area network (WAN), metropolitan area network (MAN), or the like. Network 110 is not limited, however, to connections coupling separate computer units. Rather, network 110 may also comprise subsystems that transfer data between servers or computing devices. For example, network 110 may also include a point-to-point connection, the Internet, an Ethernet, an electrical bus, a neural network, or other internal system. Furthermore, network 110 may include a WiMAX-enabled infrastructure (i.e., components that conform to IEEE 802.16 standards).

The servers 140A-F may be a type of application server, database server, or file server configurable to perform the methods described herein. In addition, each of the servers 140A-F may be a dedicated or shared server. Components of the servers 140A-F might include, without limitation, a processing unit, internal system memory, and a suitable system bus for coupling various system components, including one or more databases for storing information (e.g., files and metadata associated therewith). Each server may also include, or be given access to, a variety of computer-readable media.

Local Area Network 114 allows servers 140A-C to communicate with each other apart from network 110. The servers 140A-C are connected to the LAN through a network interface or adapter. Servers 140B and 140C may connect to network 110 through server 140A. This is just one of many aspects of operating environment 100 that may be present, but is not required, to implement embodiments of the present invention.

It will be understood by those of ordinary skill in the art that operating environment 100 is merely exemplary. While the servers 140A-F are illustrated as single boxes, one skilled in the art will appreciate that they are scalable. For example, the server 140C may, in actuality, include multiple boxes in communication. The single unit depictions are meant for clarity, not to limit the scope of embodiments in any form.

Figure 2:
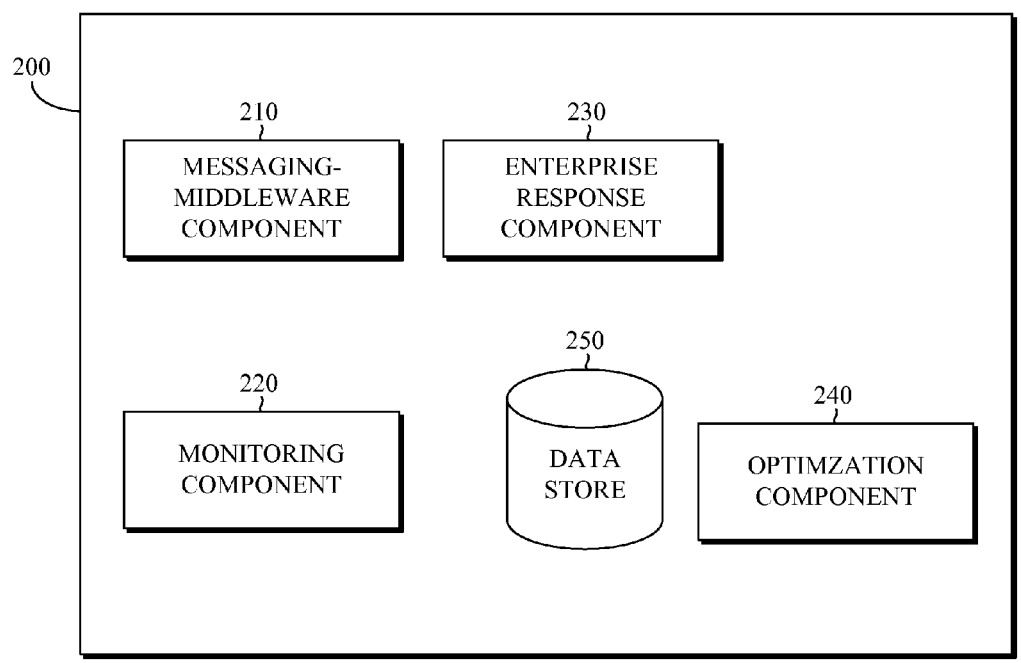
FIG. 2 is a drawing of an operating environment in which an embodiment of the present invention may be practiced.

Turning now to FIG. 2, a block diagram depicts an exemplary computing system architecture 200 suitable for automatically optimizing channel allocation for a queue manager. It will be understood and appreciated by those of ordinary skill in the art that the exemplary computing system architecture 200 shown in FIG. 2 is merely an example and is not intended to suggest any limitation as to the scope of the use or functionality of embodiments of the present invention. Neither should the exemplary computing system architecture 200 be interpreted as having any dependency or requirement related to any single component or combination of components illustrated therein.

Exemplary computing system architecture 200 includes a messaging-middleware component 210, a monitoring component 220, an enterprise response component 230, an optimization component 240, and data store 250. Exemplary computing-system architecture 200 may reside in a single computing device. In the alternative, exemplary computing system architecture 200 may reside in a distributed computing environment that includes multiple computing devices coupled with one another via one or more networks, for example, operating environment 100 described with reference to FIG. 1.

Messaging-middleware component 210 is configured to transfer information between two or more applications in the form of messages. Examples of commercially available messaging-middleware applications (a.k.a. message-oriented middleware) include IBM's WebSphere® MQ (formerly MQ Series®), Fiorano's MQ, Oracle Advanced Queuing (AQ), and Microsoft's MSMQ. The messaging-middleware component 210 can be any application that uses queues to transfer messages from one application to another. For example, information from a front-end application is formed into one or more messages. These messages from the front-end application are placed in a sending queue within the messaging-middleware component 210 and transferred into a receiving queue within the messaging-middleware component 210. A back-end program retrieves the message from the receiving queue. The message is transmitted through channels within the messaging-middleware component 210. In this example, the front-end program and the back-end program could be located on any computing device communicatively coupled to the one or more computers on which the messaging-middleware component 210 resides. A messaging-middleware client may reside on both of the computing devices on which the front-end and back-end programs reside to allow interaction with the messaging-middleware component 210.

The messaging-middleware component 210 may manage thousands of queues. In one embodiment, the messaging-middleware component 210 operates in parallel with secondary messaging-middleware components (not shown) containing additional instances of the queues managed by the messaging-middleware component 210. As described previously, a queue transfers messages between two programs. Parallel queue instances transfer the same type of message between the same two programs, but are managed by separate messaging-middleware components.

The channels, queues, and queue manager settings within the messaging-middleware component 210 are described by a series of attributes. Each attribute has an associated value or setting. For example, one attribute could be a channel name and the associated setting could be "SprintBillinginfo1." Some attributes are preset, while other attributes measure current conditions within the channel and change over time. For example, the queue name attribute is preset, but the number of channels running on a queue manager changes based on the number of channels currently running.

Monitoring component 220 is configured to monitor messaging-middleware objects (e.g., channels and queues). Examples of commercially available monitoring components include HP Openview®, Q Pasa!® by MQSoftware, Candle's PathWAI, and BMC Patrol. The monitoring component 220 may retrieve, store, and evaluate channel information periodically to ascertain whether an upset condition is present. For example, the number of channels running on a queue manager could be retrieved. Having retrieved one or more attribute values, the one or more attribute values may be evaluated against threshold values within the monitoring component 220. The monitoring component 220 may generate an alarm or incident message if attribute values are outside of normal operating conditions. The monitoring component 220 may perform one or more calculations with the one or more attribute values to arrive at a threshold. For example the monitoring component 220 may calculate the threshold channel instances for a queue manager by multiplying a maximum number of channels a queue manager is configured to run at one time by a percentage to arrive at the threshold. The current number of channels operating may then be compared against a threshold value and an incident message generated if the current number of channels is within a cautionary range. In one embodiment, the percentage is 90%.

The monitoring component 220 is also configured to generate and transmit notifications describing potential problems within a channel. A problem may be indicated when one or more attribute values or calculated values fall outside of a normal operating range. In one embodiment, the information about the potential problem is transmitted to enterprise response component 230. In another embodiment, the monitoring component 220 directly notifies a designated responder about the potential problem.

The monitoring component 220 may track which queues are active and how many threads are assigned to each. The monitoring component 220 may share this information with other components on a regular basis or in response to a request. The thread assignments may be stored and output for display.

Enterprise response component 230 is configured to coordinate a response to a problem detected in a channel. The enterprise response component 230 may receive information regarding a malfunction from a monitoring component 220 or another source. Upon receiving notification of a malfunction, the enterprise response component 230 may page a designated responder to investigate the upset condition. A designated responder may be an individual person or group of people given responsibility to fix upset conditions within certain channels. In another embodiment, the designated responder may be a computer application that takes corrective actions.

The optimization component 240 optimizes assignments of threads to queues based on various assignment rules that are circumstance specific. The optimization component 240 may reside on the application side of a messaging-middleware environment. In another embodiment, the optimization component 240 may reside within the messaging-middleware environment. Either way, the optimization component 240 is capable of controlling thread assignments to input queues, or any kind of queue. The different methodologies used by the optimization component are explained in more detail with reference to FIGS. 3-10.

Optimization of Thread Assignments to Queues

Figure 3:
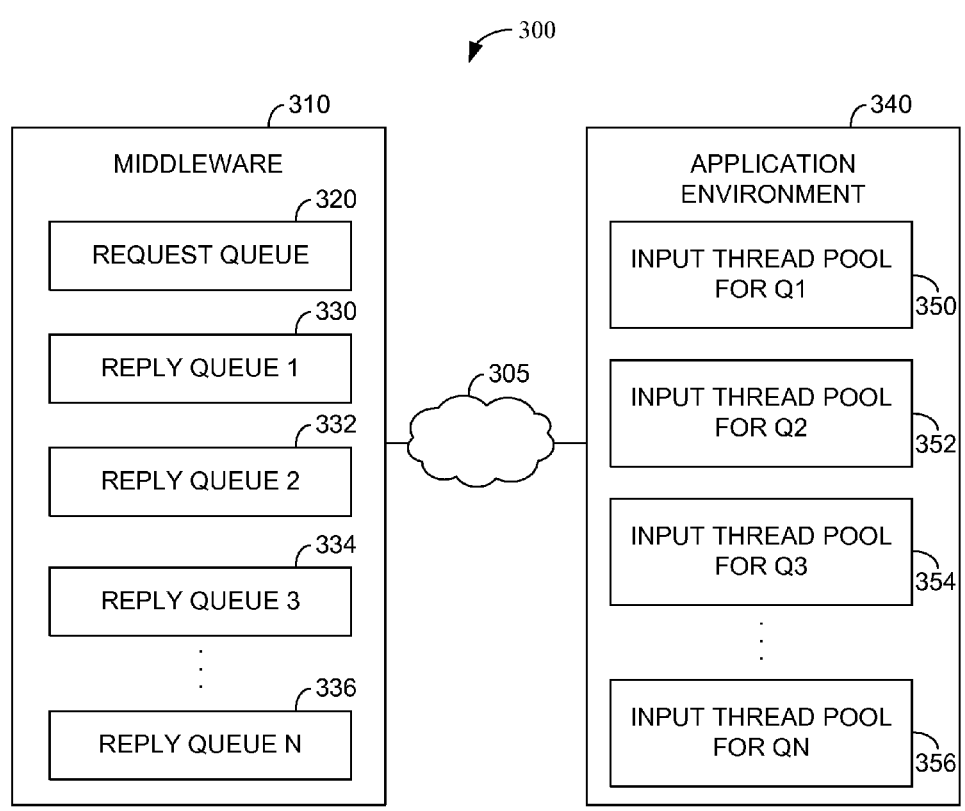
FIG. 3 is a drawing illustrating a middleware and application environment in which an embodiment of the present invention may be practiced.

Turning now to FIG. 3, a middleware and application environment is shown, in accordance with an embodiment of the present invention. Environment 300 includes middleware environment 310, which may be similar to messaging-middleware component 210 described previously with reference to FIG. 2 and application environment 340. Middleware environment 310 and application environment 340 are communicatively coupled through network 305. Network 305 may be the Internet or other computer network through which the two environments may communicate.

Middleware environment 310 includes a series of queues. The queues are used to communicate asynchronously between applications. Middleware environment 310 may translate messages and perform other functions. Though only a limited number of queues are shown in middleware environment 310, an actual implementation may have thousands of queues linking different applications as well as queues serving different purposes. In this case, a request queue 320 is shown and several reply queues are shown. The application, or applications, associated with application environment 340 retrieve messages from request queue 320.

Several reply queues are shown, including reply queue one 330, reply queue two 332, and reply queue three 334. Reply queue N 336 is the last queue in the series of queues that are associated with an application running in application environment 340. The N indicates that any amount of queues could be listed. For example, ten reply queues could be associated with an application running an application environment 340. In this case, reply queue N 336 would be reply queue ten 336.

The reply queues shown, may be different instances of the same queue. Instances of a queue have the same basis definition. In this case, all of the reply queues are associated with the same application. The reply queues and request queues are named according to a naming convention that uniquely identifies the queues. In one embodiment, the queues are named according to the application with which they are associated and then given a unique identifier, such as a serial number. Embodiments of the present invention are not limited to the naming convention used. However, in some embodiments the queues may be ordered alphabetically or numerically based on all or part of their name. For example, in the embodiment where the first part of the reply queue's name is taken from the application, causing all of the reply queues to have the same name in part, then a serial number that is part of the name may be used to order the queues.

The application environment 340 includes one or more applications that are running remotely from the middleware environment 310 and rely on the middleware environment 310 to communicate with other applications. In one embodiment, the application environment 340 is a client application embodiment that communicates with back-end services through the middleware environment 310. The back-end services are not shown in FIG. 3. However, the back-end services may also have a similar set of reply queues and request queues and methods described herein for assigning threads to various queues could apply equally to those circumstances. A single application environment is shown in FIG. 3 for the sake of simplicity.

The application environment 340 includes a series of thread pools. The pools are shown for illustrative purposes and may not exist as a group in an actual implementation. In an actual implementation, the pools may not be organized in precisely this fashion. The pool may be thought of as a group of threads that are assigned to a particular queue. In an actual embodiment, the threads may not be grouped in any particular order though each thread may be associated with a single queue. In this case, the application environment 340 includes an input thread pool for queue one 350, an input thread pool for queue two 352, and an input thread pool for queue three 354. In addition, the application environment 340 includes an input thread pool for queue N 356. The N indicates that it is the last queue and that any number of queues may be used. In this case, the N in input thread pool 356 corresponds with the N in reply queue N 336.

In FIG. 3, there is a one-to-one correlation between the thread pools and reply queues. However, this does not necessarily need to be the case. For example, in various embodiments there may be active reply queues that have no threads associated with them for whatever reason. In this case, there would not be a one-to-one correlation necessarily between the pools and the queues. There may be intervals where there are active threads that are associated with a queue that has been shut down for whatever reason. Generally, this may cause an error, but could also result from a timing difference between when the queues are shut down within the messaging-middleware environment and the thread is terminated within the application environment 340. Embodiments of the present invention do not specifically require that there be a one-to-one correlation between thread pools and reply queues at all times.

Turning now to FIGS. 4-8, examples of the thread assignment circumstances, and the responses taken to those circumstances within embodiments of the present invention are illustrated. For each of these illustrations, the low threshold for active threads is 500 and the high threshold for active threads is 1,000. Embodiments of the present invention are not limited to these thresholds.

Figure 4:
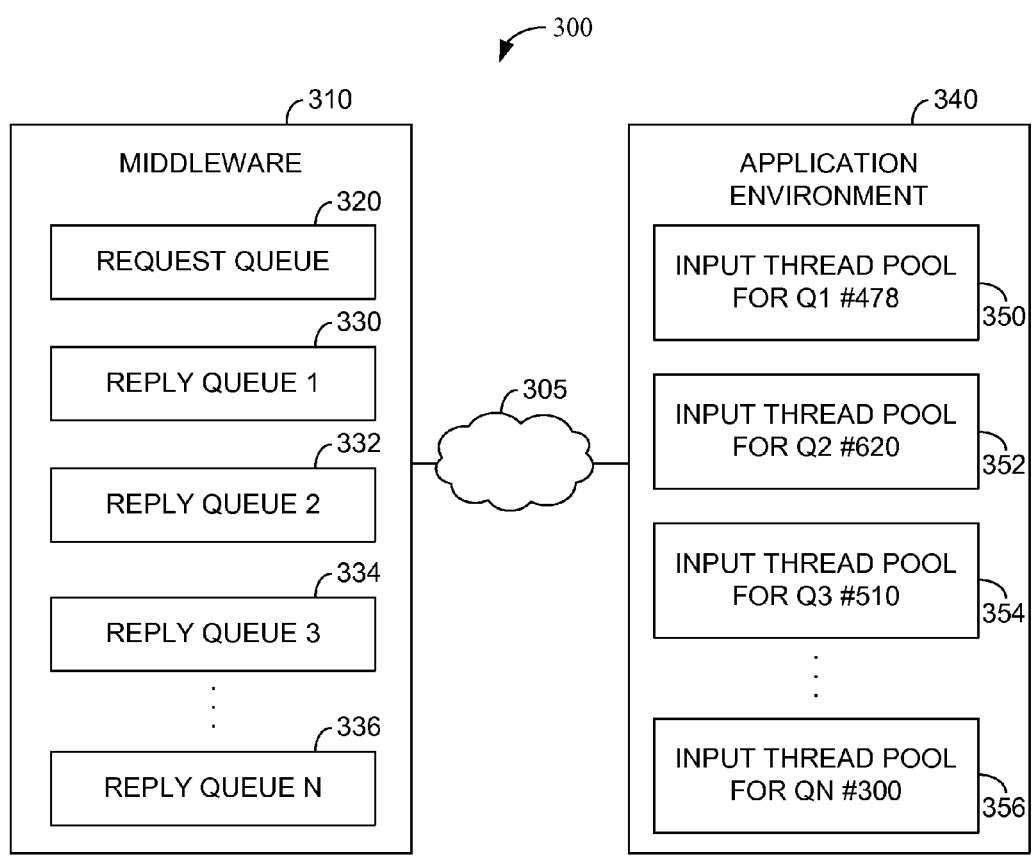
FIGS. 4-8 are drawings illustrating different thread levels, according to embodiments of the present invention.

In FIG. 4, each input thread shows the number of active threads within the pool. Again, the active threads within the pool indicate how many active threads are associated with a particular reply queue. Thus, input thread pool for queue one 350 has 478 active threads. This means that reply queue one 330 has 478 active threads associated with it that are at least capable of communicating messages from application environment 340 to the reply queue one 330. A thread may be active, though it is not necessarily communicating messages the entire time it is active. As can be seen, the input thread pool for queue two has 620 active threads and the input thread pool for queue three has 510. The input thread pool for queue N has 300 active threads.

In one embodiment, the number of active threads for each queue is first determined. The queues then may be broken into two groups. The first group comprises queues that have less than the low threshold amount of active threads. The second group has more than the low threshold amount of active threads. In this case, input thread pool one 350 and input thread pool N 356 have less than 500 active threads and would be associated with the first group. If there is no first group, then the process will move on to analyzing the second group.

In the example given in FIG. 4, however, there is a first group. Reply queues within the first group may be ordered according to their name or some other methodology. As the need to assign new threads arises, the reply queues are filled one by one until they reach the low threshold amount. For example, 22 threads could be assigned to reply queue one 330 until it reaches 500 total threads. After reply queue one 330 is filled, threads could be assigned to reply queue N 336 until reply queue N 336 is full.

Figure 5:
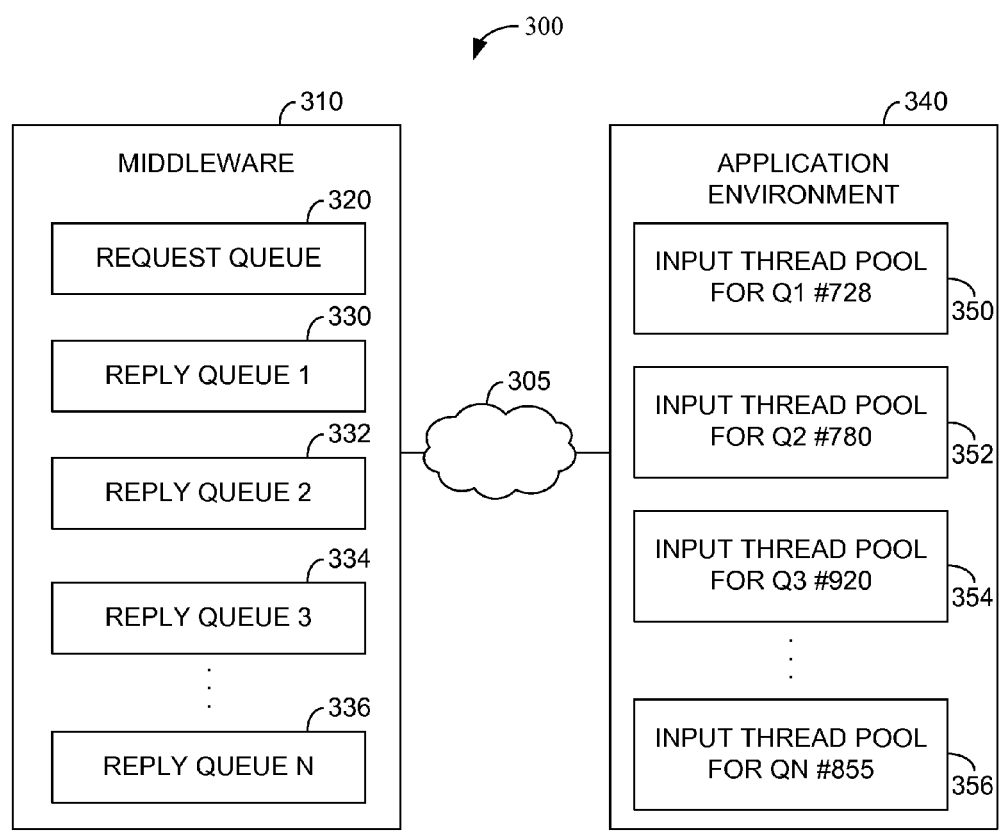

Turning now to FIG. 5, an example is shown where none of the input thread pools fall into the first category mentioned with reference to FIG. 4. As can be seen, all of the thread pools have more than the low threshold amount of 500 active threads. As mentioned, the high threshold amounts in these examples is 1,000. Accordingly, all of the input thread pools have less than the high threshold amounts. In this situation, as the need arises to assign new threads to a reply queue, the threads may be assigned to the reply queues in a round-robin fashion. The round-robin fashion may be a particular designated order. In another embodiment, the input threads are assigned randomly. This should have a similar result to the round robin method, but does not require any predetermined round robin arrangement. In another embodiment, the actual amount of active threads assigned to each reply queue is considered. In this example, groups of threads may be assigned to the reply queue that starts out with the lowest amount of active threads. For example, 20 threads could be assigned to reply queue one 330. In another embodiment, the difference is taken between the reply queue with the least amount of active threads and the reply queue with the second least amount of active threads. In this case, that would be reply queue one 330 and reply queue two 332. Once the difference is taken, that amount of threads is assigned to the queue having the lowest amount of active threads. In this case, 52 new threads would be assigned to reply queue one 330. At that point, the total threads assigned to each pool may be recalculated and the process may continue iteratively. In general, the amount of threads assigned to each other pool might have gone down as threads became inactive while threads were assigned to the first queue.

Figure 6:
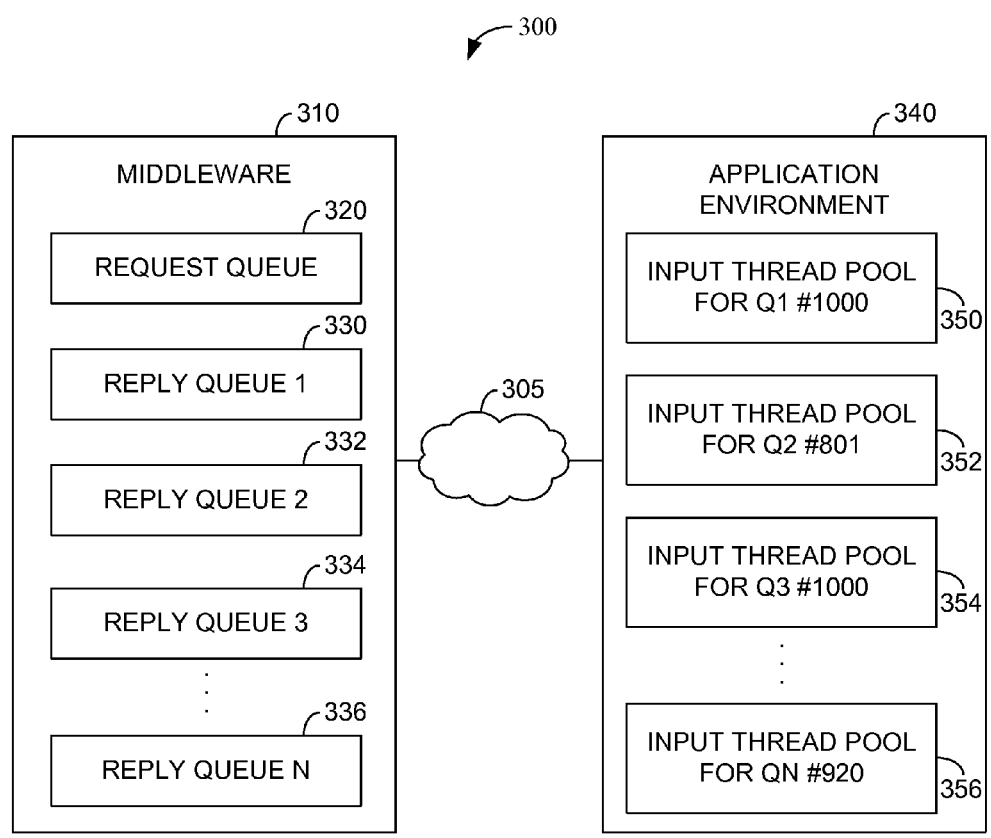

Turning now to FIG. 6, another example of thread assignments is illustrated under different circumstances. In this case, reply queue one 330 and reply queue three 334 both have 1,000 threads assigned to them. As mentioned, 1,000 is the high threshold amount. It should be noted that the high threshold amount is not necessarily the maximum amount of threads that could be assigned to the reply queue. In one embodiment, the high threshold amount represents a buffer between the max amount. Thus, in an emergency situation when all of the reply queues have more than the high threshold amount and the maximum amount of reply queues allowed within middleware environment 310 are created, then new threads could be assigned to reply queues until the maximum amount for the reply queue is reached.

In this case, reply queue two 332 and reply queue N 336 fall into the second group having more than the low threshold amount, but less than the high threshold amount. New threads may be assigned to these two queues according to the methodologies discussed previously with reference to FIG. 5. For example, they could be assigned in round robin or random fashion.

Figure 7:
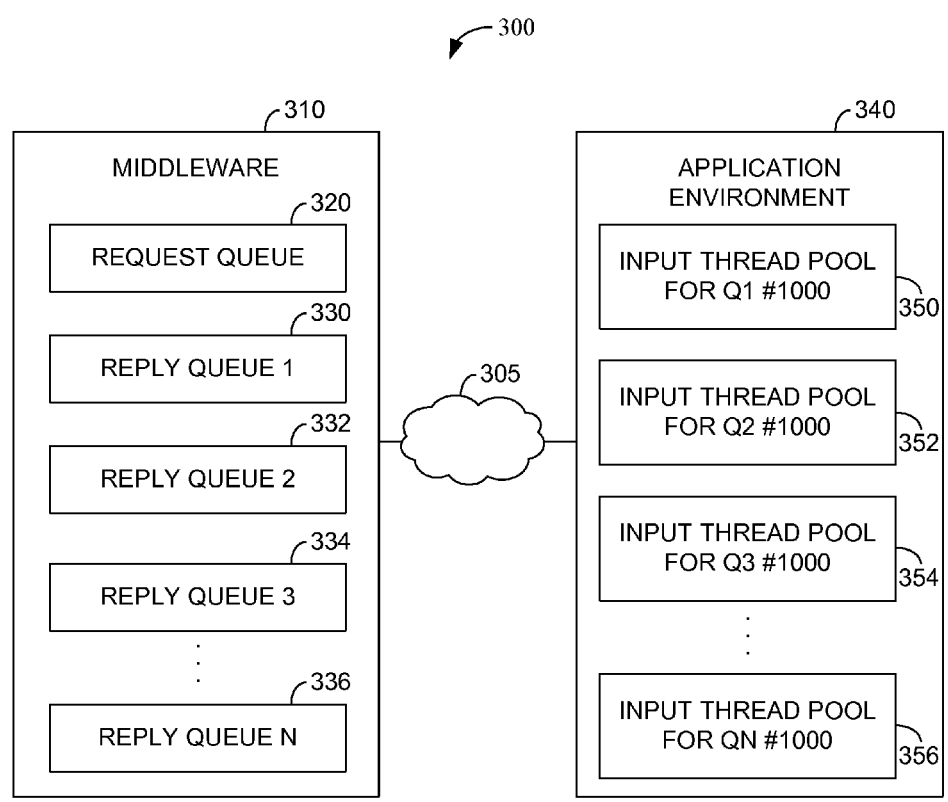

Turning now to FIG. 7, all of the reply queues that are active have 1,000 threads assigned to them. In this situation, an instruction is sent to the messaging-middleware environment 310 to create a new reply queue to which threads may be assigned. The new reply queue may be a new instance of the existing reply queues. The new queue is illustrated in FIG. 8.

Figure 8:
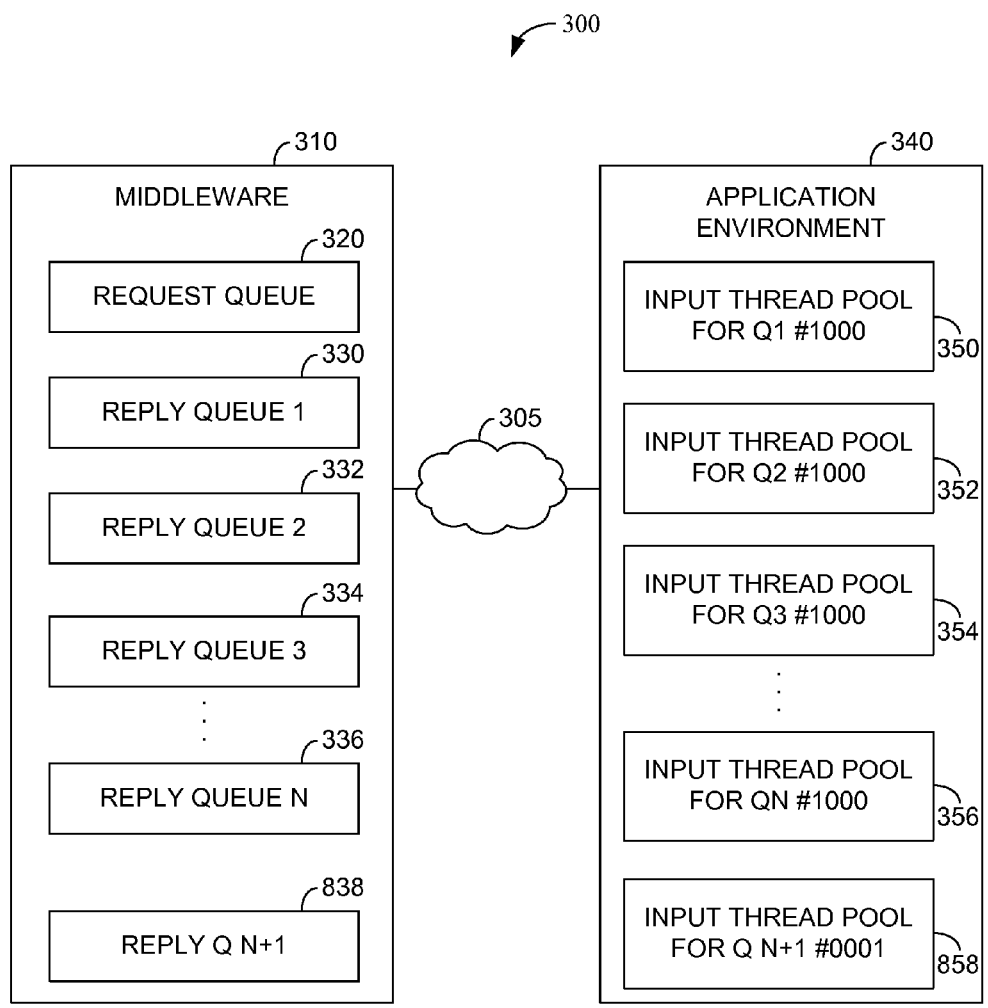

In FIG. 8, a new reply queue 838 designated as reply queue N+1 is shown. This creates an additional thread pool N+1 858 showing a single thread. As soon as the next new thread needs to be created, the new input thread pool 858 would fall into the first category since it has below the low threshold amount of active threads. This may be an iterative process, and the entire process may repeat each time the need arises to assign a new thread. Since threads are deactivated, the different amount of threads assigned to each pool, or in effect, to each reply queue, may change rapidly. Thus, for a brief time the input thread pool 858 may be the only queue in the first category that could change quickly and several other input thread pools could also fall into the new category.

Figure 9:
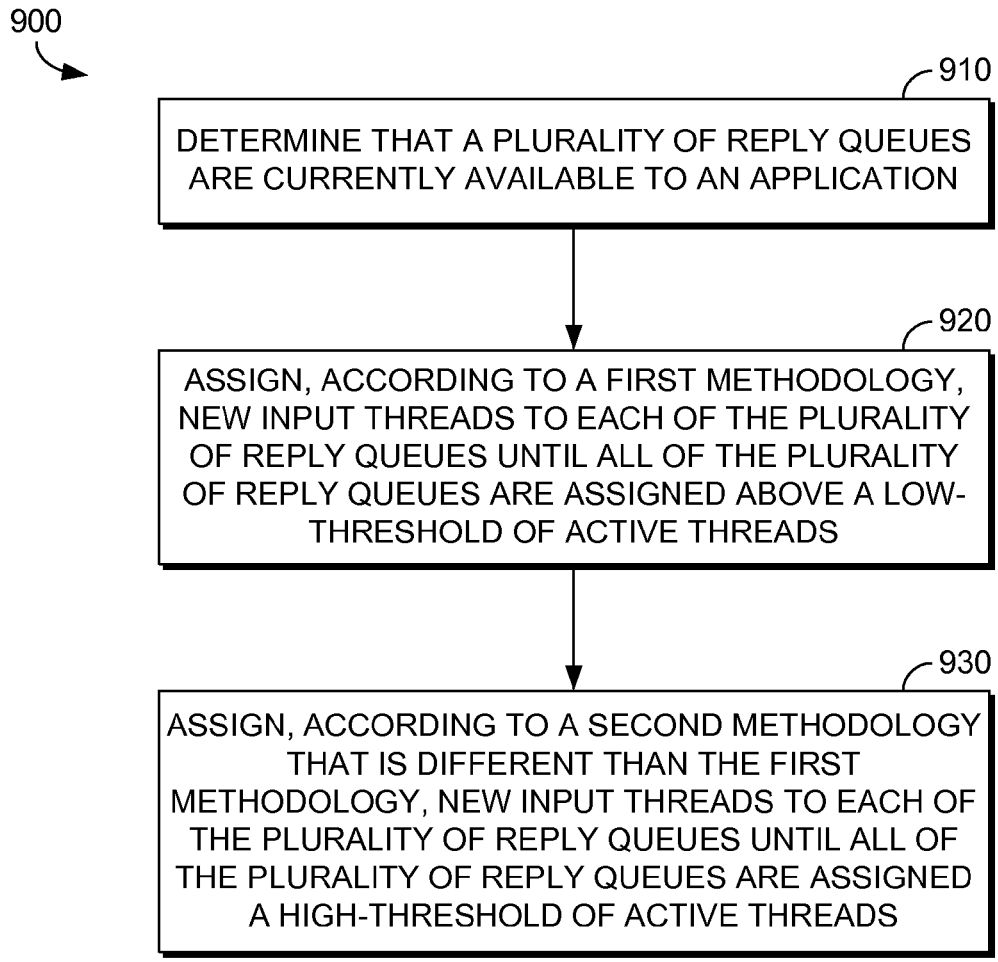
FIG. 9 is a flow chart showing a method of optimizing an allocation of input threads to queues within a messaging-middleware environment, according to an embodiment of the present invention.

Turning now to FIG. 9, a method 900 of optimizing an allocation of input threads to queues within a messaging-middleware environment is shown, in accordance with an embodiment of the present invention. Examples using method 900 have been explained previously through the examples of FIGS. 3-8. An exemplary messaging-middleware environment has also been described previously with reference to FIG. 2. At step 910, a plurality of queues are determined to be currently available to an application. This determination may be made by surveying the queues that are associated with the particular application within the messaging-middleware environment. In addition to determining that they are available, the number of threads assigned to each of the available queues is also determined. This determination may be made every time the need arises to assign a new thread to a queue.

At step 920, a new input thread is assigned to each of the plurality of queues until all of the plurality of queues are assigned above a low threshold of active threads. A first methodology is used to assign new input threads to each of the plurality of queues until the low threshold is reached. This may be similar to the methodologies described previously for assigning new threads to queues. For example, the queues may be listed in alphabetical or numerical order and assigned to the first queue in the list until the low threshold is reached. Note that the process may be iterative, meaning that it repeats every time there is a need to assign a new input thread. Using the same method of ordering will ensure that the thread is assigned to the same queue until the low threshold is reached. Once the low threshold is reached it would no longer qualify as a low threshold queue and the next queue in alphabetical or numerical order would then be assigned new threads. Once the first queue falls below the threshold again, it may begin to preferentially receive the new threads. The overall effect is to keep assigning threads to certain queues. This may allow queues at the other end of the alphabetical or numerical spectrum to reach zero active threads. At this point, those queues may be shut down based on various queue management strategies. As will be seen, the method 900 allows for new queues to be open once all of the existing queues reach the high threshold amount.

At step 930, new threads are assigned to each of the plurality of queues until all of the plurality of queues are assigned a high threshold of active threads, as was illustrated with reference to FIG. 7. The second methodology is different from the first and generally encourages an equal distribution of new thread assignments across available queues. This may be accomplished by a round robin, random, or some other distribution scheme. Once all of the queues are assigned a high threshold of active threads then an instruction to generate a new queue is sent to the messaging-middleware environment. At that point, new threads are assigned to the new queue according to the methodology described previously.

Figure 10:
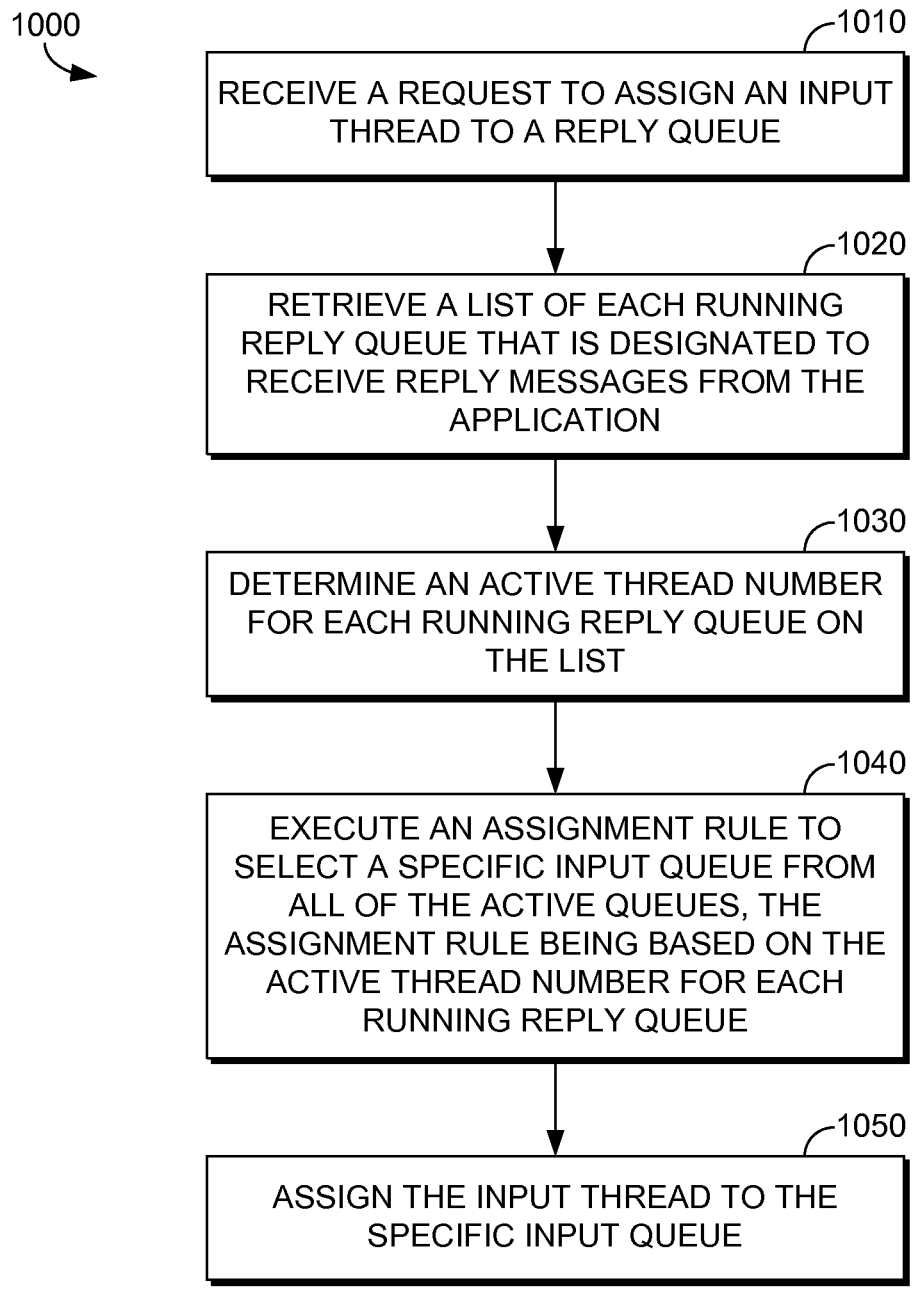
FIG. 10 is a flow chart showing a method of optimizing an allocation of threads to messaging-middleware queues, according to an embodiment of the present invention.

Turning now to FIG. 10, a method of optimizing an allocation of input threads to queues within a messaging-middleware environment is shown, in accordance with an embodiment of the present invention. At step 1010, a request to assign an input thread to a queue is received. This request may be received from an application wishing to communicate a message to a queue within a messaging-middleware environment.

At step 1020, a list of each active queue is retrieved. The queues in the list are designated to receive reply messages from the application. As mentioned, a messaging-middleware environment may include thousands of different queues associated with different applications. Thus, embodiments of the present invention seek to find queues that are active for a particular application that requested assignment of the input thread.

At step 1030, an active thread number is determined for each active queue on the list. The active thread number describes how many active threads are assigned to a particular queue.

At step 1040, an assignment rule is executed to select a specific input queue from all of the active queues. The assignment rule is based on the active thread number for each active queue. In other words, the assignment rule takes the active number of threads into consideration when assigning a new thread to an active queue. Different assignment rules have been illustrated previously. In one embodiment, a first methodology is used to assign threads to queues having below a low threshold amount of active threads and a different methodology is used to assign threads to queues having between a low threshold and a high threshold. A third methodology may be used to generate a new queue when the others have reached the high threshold amount.

At step 1050, the input thread is assigned to the specific queue selected based on the assignment rule executed in step 1040.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. One or more non-transitory computer-readable media having computer-executable instructions embodied thereon for performing a method of optimizing an allocation of threads to messaging-middleware queues, the method comprising:
   receiving a request to assign an input thread to a queue, wherein the input thread helps communicate a message from an application to the queue;
   retrieving a list of active queues that are designated to receive messages from the application;
   determining an active thread number for each active queue on the list;
   executing an assignment rule to select a specific queue from all of the active queues, the assignment rule being based on the active thread number for each active queue, wherein the assignment rule requires that all queues with below a low threshold of active threads be filled before threads are assigned to a queue having more than the low threshold of active threads; and
   assigning the input thread to the specific queue.

2. The media of claim 1, wherein the assignment rule requires:
   when one or more low queues have the active thread number below the low threshold of active threads, selecting the specific queue according to a selection rule from among the one or more low queues,
   when no queues have the active thread number below the low threshold of active threads, determining whether any of the active queues have the active thread number below a high threshold of active threads and, when one or more high queues have the active thread number below the high threshold of active threads, then selecting the specific queue according to the selection rule from among the one or more high queues, and when none of the queues have below the high threshold of active threads then communicating an instruction to create a new queue, then selecting the specific queue being the new queue.

3. The media of claim 1, wherein the selection rule is selecting the specific queue randomly from queues that satisfy the assignment rule.

4. The media of claim 1, wherein the selection rule is selecting the specific queue from queues that satisfy the assignment rule using an order created using names of the queues that satisfy the assignment rule.

5. The media of claim 1, wherein the selection rule is selecting the specific queue from queues that satisfy the assignment rule.

6. The media of claim 1, wherein the selection rule is selecting the specific queue in round robin fashion from queues that satisfy the assignment rule.

* * * * *